United States Patent [19]
Karim

[11] 3,917,864
[45] Nov. 4, 1975

[54] USE OF PROSTAGLANDINS E AND F FOR INDUCTION OF LABOR

[76] Inventor: Sultanali M. M. Karim, 3 Ekodo Ave., Kampala, Uganda

[22] Filed: June 20, 1974

[21] Appl. No.: 481,101

Related U.S. Application Data

[63] Continuation of Ser. No. 331,626, Feb. 12, 1973, abandoned, which is a continuation of Ser. No. 151,847, June 10, 1971, abandoned, which is a continuation-in-part of Ser. No. 846,223, July 30, 1969, abandoned.

[52] U.S. Cl. .............................. 424/305; 424/317
[51] Int. Cl.² ................ A61K 31/19; A61K 31/215
[58] Field of Search ...................... 424/305, 318

[56] References Cited
OTHER PUBLICATIONS

Bygdeman et al. Nobel Symposium-2-Prostaglandins —June 1966 (published 1967) pp. 93–96.
Horton — Physiological Reviews Vol. 49 No. 1 (Jan—1969) pp. 129+130.
Bygdeman et al. — Am. J. of Obst. & Gynecol. Vol. 102 No. 3 (Oct. 1, 1968 pp. 317–319.
Bergstrom et al. — Pharmacological Reviews Vol. 20 No. 1 (1968) p. 20.
Karim et al. — Brit Med. J. Nov.–Dec. 1968 pp. 621–623.

*Primary Examiner*—Sam Rosen
*Attorney, Agent, or Firm*—Edward G. Jones; Earl C. Spaeth

[57] ABSTRACT

Methods are provided for inducing labor in gestating mammals, including humans and valuable warm-blooded animals such as horses, cows, monkeys and pigs by systemically administering to a gestating mammal a pharmaceutical dosage unit form supplying an effective nontoxic amount for inducing labor of a member selected from the group consisting of $PGE_1$, $PGE_2$, $PGE_3$, dihydro-$PGE_1$, $PGF_{1\alpha}$, $PGF_{2\alpha}$, $PGF_{3\alpha}$, dihydro-$PGF_{1\alpha}$, $PGF_{1\beta}$, $PGF_{2\beta}$, $PGF_{3\beta}$, dihydro-$PGF_{1\beta}$, pharmaceutically-acceptable salts thereof, pharmaceutically-acceptable acylates thereof wherein the acyl radical is that of a lower alkanoic acid having 1 to 8 carbon atoms, inclusive and pharmaceutically-acceptable carboxylate esters thereof where in the esterifying radical has 1 to 8 carbon atoms, inclusive.

16 Claims, No Drawings

USE OF PROSTAGLANDINS E AND F FOR INDUCTION OF LABOR

CROSS REFERENCE TO RELATED APPLICATION

This application is a continuation of copending application Ser. No. 331,626, filed Feb. 12, 1973, now abandoned, which is a continuation of copending application Ser. No. 151,897, filed June 10, 1971, now abandoned, which is a continuation-in-part of copending application Ser. No. 846,223, filed July 30, 1969, now abandoned.

BACKGROUND OF THE INVENTION

A crude mixture, called prostaglandin was reported by Goldblatt, Chem. Ind. London 52, 1056 (1933); J. Physiol. London 84, 208 (1935) and von Euler, Arch. Exp. Path., Pharm. Abs. 175,78 (1934); 181 (1936); J. Physiol. 72,74 (1931); 81,102 (1934); 84, 21 (1935); 88, 213 (1936); and Klin. Wschr. 14, 1182 (1935). Since then isolation, purification, preparation of derivatives and biological studies of the prostaglandins have continued. For example, microbiological conversions of unsaturated fatty acids with mammalian glandular tissue are described in U.S. Pat. Nos. 3,290,226 and 3,296,091. In U.S. Pat. 3,290,226 PGE compounds are described including $PGE_1$, $PGE_2$, and $PGE_3$. The PGE series is characterized by the presence of the keto group at the 9-position in the cyclopentane ring. More recently, Ramwell et al., "Prostaglandins" in Progress in the Chemistry of Fats and other Lipids, Vol. 9 edited by R. Holman, pp. 231-273, Pergamon Press, Oxford, 1968 refer to prostaglandin $PGE_1$ and 11α,15(S)-dihydroxy-9-oxo-13-trans-prostenoic acid, $PGE_2$ as 11α,15(S)-dihydroxy-9-oxo-5-cis,13-trans-prostadienoic acid and $PGE_3$ as 11α,15(S)-dihydroxy-9-oxo-5-cis,13-trans,17-cis-prostatrienoic acid. $PGE_1$ is converted to dihydro-$PGE_1$ by catalytic hydrogenation as described in Belgian Pat. No. 685,516. Following the prostanoic acid nomenclature, dihydro-$PGE_1$ is named as 11α,15(S)-dihydroxy-9-oxoprostanoic acid.

Pharmaceutically acceptable salts, for example, those of alkali metals and alkaline earth bases, such as the sodium, potassium, calcium and magnesium salts; those of ammonia or a basic amine such as mono-, di-, and triethyl amines, benzylamines, heterocyclic amines such as piperidine and morpholine, and amines containing water-solubilizing or hydrophilic groups such as triethanolamine, tris-(hydroxymethyl)aminomethane, and phenylmonoethanolamine are described in U.S. Pat. No. 3,296,091. Carboxylate esters, wherein the esterifying radical has 1 to 8 carbon atoms inclusive, especially 1 to 4 carbon atoms, inclusive, illustratively the methyl, ethyl, butyl, cyclohexyl and octyl esters are formed by the usual methods, e.g., reaction with diazomethane or similar diazonydrocarbons as in U.S. Pat. No. 3,296,091. Acylates of lower alkanoic acids of 1 to 8 carbon atoms, inclusive, are prepared in the usual manner by reaction of the respective prostaglandin acids with the appropriate acid anhydride or acid halide, e.g., those of formic, acetic, propionic, butyric, isobutyric, valeric, caproic, caprylic and the like acids, as in Great Britain patent specification No. 1,040,5444. Among these, the acylates wherein the acyl radical has 2 to 4 carbon atoms are preferred especially the acetate.

Biological studies of the prostaglandins, for example, actions on smooth muscle, reproductive system, nervous system, cardiovascular system, and relationship to lipid and carbohydrate metabolism, and miscellaneous effects are summarized by Bergstrom et al.; "The Prostaglandins: A Family of Biologically Active Lipids", Pharmacological Reviews, Vol. 20, No. 1, p. 1 et sequitur, March, 1968, the Williams and Wilkins Company. Further biological studies include the effect of $PGF_{2\alpha}$ on isolated strips of human pregnant and non-pregnant myometrium in virto. Bygdeman (1964) Acta. Physiol. Scand. 63, (suppl. 242), 1; Pickles and Hall (1963) J. Reprod. Fert. 6, 315 and Sandberg et al. (1965) Acta. Obstet, Gynec. Scand, 44, 585. Also, Karim, S.M.M. (1966) J. Obstet, Gynaec. Brit. Cwlth. 73, 903 and Karim and Devlin (1967) ibid., 230 have shown that $PGF_{2\alpha}$ is present in human amniotic fluid obtained during labor. Further, Karim, British Med. J. 4, 618 (1968) has shown that $PGF_{2\alpha}$ appears in the maternal venous blood in variable amounts during labor.

It is against this background that the present invention has been conceived and embodied.

BRIEF SUMMARY OF THE INVENTION

This invention relates to the use of certain prostaglandins for benefically and advantageously inducing labor in mammals including humans and animals. More specifically the prostaglandin active ingredients are administered in dosage unit forms of pharmaceuticals for supplying to the treated subjects an effective amount of said ingredient for inducing labor in mammals, including humans and valuable warm-blooded animals such as horses, cows, monkeys and pigs. They are benefically treated systemically, e.g., by buccal, sublingual, oral and parenteral routes of administration. The active prostaglandin ingredient is a compound selected from the group consisting of $PGE_1$, $PGE_2$, $PGE_3$, dihydro-$PGE_1$, $PGF_{1\alpha}$, $PGF_{2\alpha}$, $PGF_{3\alpha}$, dihydro-$PGF_{1\alpha}$, $PGF_{1\beta}$, $PGF_{2\beta}$, $PGF_{3\beta}$, dihydro-$PGF_{1\beta}$, pharmaceutically acceptable salts thereof, acylates thereof wherein the acyl radical is that of a lower alkanoic acid having 1 to 8 carbon atoms, inclusive, and carboxylate esters thereof wherein the esterifying radical has 1 to 8 carbon atoms, inclusive. These are to be construed as including the optically active compounds of the natural configuration and the racemic compounds. These compounds are known in the art or are available by methods known in the art. For the racemic compounds, see, for example, J. Am. Chem. Soc. 91:5364 (1969); J. Am. Chem. Soc. 91:5372 (1969); Chem. Communications, 302 (1969); and Chemical Communications, 602 (1970). In the animals, treatment spans are involved except in the case of multiple fetuses, for example, in pigs wherein early inducement of labor is usually to be avoided. Pigs normally farrow after a gestation period of 112 to 116 days. Cattle normally gestate for from about 265 to about 290 days. Horses have a gestation period of about 11 months. Beyond these times one usually encounters post-term situations during which inducement of labor by the inventive process is useful and beneficial. Earlier induction of labor is sometimes desirable, for example, in the case of a mummified fetus in a cow.

DESCRIPTION OF THE PREFERRED EMBODIMENTS

It is especially advantageous to administer dosage unit forms for ease and economy of administration and uniformity of dosage. Dosage unit form as used in the specification and claims herein refers to physically discrete units suitable as unitary dosages for animal and human subjects, each unit containing a predetermined quantity of active material calculated to produce the desired biological effect in association with the required pharmaceutical means.

Illustratively, effectiveness of the pharmaceutical preparations and methods of administration in the mammals is dependent on providing thereto an effective amount of the active ingredient for inducing labor. In harmony with the concept of administering to the subject such an effective amount of the prostaglandin-type ingredient various dosage unit forms are operable. Illustratively, intravenous infusion of a sterile aqueous pharmaceutical preparation containing the aforesaid active ingredient is an effective mode of administration. Another embodiment is a sterile pharmaceutical unit dosage preparation in an aqueous or oily vehicle. A further embodiment is a sterile aqueous suspension of a carboxylate ester as heretofore described or an acylate as heretofore described. Yet another embodiment is a solid pharmaceutical preparation adapted for sublingual or buccal administration whereby the principal active ingredient is directly available to the blood supply and thereby exerts its beneficial effect. Other injectables are, for example, combinations of a water-soluble salt and an acylate or carboxylate ester to provide both immediate and prolonged action. A dry preparation for reconstitution as desired with an appropriate liquid, e.g. sterile saline is yet another embodiment. Thus, the pharmaceutical preparations for injectable administration are, for example, sterile aqueous solutions, sterile aqueous suspensions, sterile oily solutions or suspensions, sterile powders for subsequent incorporation into an injectable form by addition of the required sterile vehicle and the like. The solutions or suspensions are compounded with the required pharmaceutical means such as preservatives, suspending and dispersing agents, and isotonic agents, for example, methyl and propyl parabens, polyethylene glycols, especially polyethylene glycol 4000, sodium carboxymethylcellulose, sodium alginate, polyvinyl pyrrolidone, polysorbate 80, condensation products of ethylene oxide with fatty acids, for example polyoxyethylene stearate; or with fatty alcohols, for example heptadecaethyleneoxycetanol, or with partial esters, for example polyoxyethylene sorbitol monoleate or hexitans derived from sorbitol, for example polyoxyethylene sorbitan monoleate; sodium chloride and glucose. Suspensions in oily media are prepared by dispersing the active ingredient in an acceptable oily means, for example a vegetable oil such as sesame oil, peanut oil and cottonseed oil. These may contain means to delay absorption, for example aluminum monostearate. All dosage unit forms for injectable administration must be sterile as is known and practiced in the art.

The amount of the essential active ingredient varies with the age, weight and condition of the subject to be treated. Said subjects are benefically treated according to the process of the present invention for inducing labor in human clinical conditions such as hypertension, diabetes, attainment of post-term without normal delivery, toxemia, uterine death, and premature rupture of membranes and in similar conditions in the animals. In the case of human subjects treatment to induce labor occurs within a span of time beginning at about 28 weeks of pregnancy and ending at post-term, for example, about 45 weeks. Hence most patients are at or near term.

Illustratively, in an infusion process of treating a human subject to induce labor a sterile infusion solution is prepared to contain the essential active ingredient in a concentration of from about 5 mcg./ml. to about 100 mcg./ml. Such a solution is administered, usually with the aid of an infusion pump to provide a dosage of from about 2.5 nanograms per kilo per minute to about 400 nanograms per kilo per minute, preferably in a volume per hour of aabout 15 ml. The duration of the infusion usually ranges from about 1 hour to about 16 hours within which time period labor is induced. Occasionally a second infusion is required. In another embodiment of the inventive process of inducing labor from about 1/2 mg. per kilo to about 50 mg. per kilo of body weight of the mammal is injected at one time, preferably subcutaneously. Spacing of such injections and repeated injections are used, accompanied by monitoring of the clinical condition of the treated subject, especially animals in this method of administration, insofar as induction of labor is concerned. With the inventive process it has unexpectedly been found that speeding of heart rate is avoided and less tendency for uterine hypertoxicity occures thus providing advantages over a pituitary solution for inducing labor. The third stage of labour is normal and blood loss is minimal.

Illustratively, in a process of oral administration of a dosage form water or aqueous normal saline is used to prepare a solution containing the essential active ingredient. In the case of $PGE_2$ 100 MCG to 200 MCG is used per milliliter of the water or saline. From 2½ to 5 milliliters of the so-prepared solution, each dose being 500 MCG, is administered orally. Depending upon the individual human patient the dose of 500 MCG is repeated every 3 hours as required up to 5 doses. Some patients require only one dose whereas others will require 2 or more doses up to 5 doses. Generally, in the case of $PGF_{2\alpha}$ the dose is about 10 times that of $PGE_2$.

The following embodiments of the inventive concept set forth the manner and process of making and using the invention but are not to be construed as limitations thereof.

EXAMPLE 1

Intravenous Infusion Process 100 mg. of $PGF_2$ is dissolved in 10 ml. of ethanol. 0.1 ml. of this solution containing 1 mg. is diluted to 50 ml. with sterile physiological saline solution providing a solution containing 20 mcg. per ml. The solution is sterilized by filtration and placed in a Palmer infusion pump. The pump is monitored so that the $PGE_{2\alpha}$ is intravenously infused to a post-term pregnant human at a rate of 50 nanograms per kilo per minute for approximately 6 hours. After this time labor is induced and progresses to delivery of a normal live infant.

Other pharmaceutical dosage unit forms for intravenous infusion are prepared to provide dosages of the other essential active ingredients within the aforesaid range of from about 2.5 to about 400 nanograms per kilo per minute. Equally beneficial results are obtained in the other clinical conditions, for example, expulsion of a dead fetus at about 28 weeks of pregnancy.

EXAMPLE 2

Parenteral Preparation and Process

The active ingredient, $PGF_{1\alpha}$ is dissolved in q.s. ethanol. A solution of sodium chloride and mannitol in water for injection is added thereto. The whole is sterilized by aseptic filtration. Filling into individual vials and free-drying provides a sterile solid preparation containing per vial 0.1 mg. of the $PGF_{1\alpha}$, 22.5 mg. of pure sodium chloride and 137.5 mg. of mannitol N.F.

At the time of use in humans, the sterile preparation is reconstituted with 1 ml. of sterile water for injection containing a compatible preservative. The reconstituted solution is diluted in sterile saline to provide a sterile solution for intravenous infusion containing 50 mcg. per milliliter.

EXAMPLE 3

Parenteral Administration of Sterile Aqueous Suspension

A sterile aqueous suspension is prepared to contain 400 mg. of the acetate of $PGE_2$. This suspension is administered to a horse post-term during its gestation period at a dosage of about 25 mg. per kg. of body weight to facilitate induction of labor and foaling.

EXAMPLE 4

Sublingual Process of Administration

A tablet for sublingual administration containing polyethylene glycol 4000, polyethylene glycol 6000 and 50 mg. of $PGE_{1\beta}$ is prepared and administered sublingually twice a day post-term in a human female post-term to bring about induction of labor and normal delivery of a live infant.

EXAMPLE 5

Oral Preparation and Process $PGE_2$ is dissolved in sterile water to provide a solution containing 100 mcg. of the $PGE_2$ per milliliter. An at-term human patient is given 5 milliliters orally, providing an initial dose of 500 mcg of active ingredient. After 3 hours this dose is repeated. Uterine contractions appear in about 5 minutes and normal labor is induced with successful delivery.

EXAMPLE 6

Oral Preparation and Process $PGF_{2\alpha}$ is suspended in sterile water to give a suspension containing 1 mg. of $PGF_{2\alpha}$ per milliliter. An at-term human patient is given 5 milliliters of the suspension orally, providing 5 mg. of active ingredient. The patient starts regular uterine contractions within 2 hours, and the same oral dose is repeated every 2 hours until she is in the active phase of labor with adequate contractions every 2 or 3 minutes and a cervical dilation of 5–6 cm. Thereafter, successful delivery occurs without further administration of the $PGF_{2\alpha}$.

Other pharmaceutical preparations in unit dosage forms are prepared with the other aforesaid essential active ingredients and administered in accordance with the process of the present invention to bring about induction of labor and delivery in humans and to bring about similar induction and parturition in the animals such as cows, pigs, horses and monkeys.

I claim:

1. A method of inducing labor and delivery in a gestating mammal at or near term which consists essentially of administering systemically to a said mammal a pharmaceutical dosage unit form supplying an effective nontoxic amount for inducing labor and delivery of a prostaglandin selected from the group consisting of $PGE_1$, $PGE_2$, $PGE_3$, dihydro-$PGE_1$, $PGF_{1\alpha}$, $PGF_{2\alpha}$, $PGF_{3\alpha}$, dihydro-$PGF_{1\alpha}$, $PGF_{1\beta}$, $PGF_{2\beta}$, $PGF_{3\beta}$, dihydro-$PGF_{1\beta}$, pharmaceutically acceptable salts thereof, pharmaceutically acceptable acylates thereof wherein all hydroxy groups are acylated and the acyl radical is that of a lower alkanoic acid having 1 to 8 carbon atoms, inclusive and pharmaceutically acceptable alkyl esters thereof wherein the alkyl radical has 1 to 8 carbon atoms, inclusive.

2. The method of claim 1 wherein the gestating mammal is a human.

3. The method of claim 2 wherein the prostaglandin is $PGE_2$ or a pharmaceutically acceptable salt thereof.

4. The method of claim 2 wherein the prostaglandin is an alkyl ester of $PGE_2$.

5. The method of claim 2 wherein the prostaglandin is $PGF_{2\alpha}$ or a pharmaceutically acceptable salt thereof.

6. The method of claim 2 wherein the prostaglandin is an alkyl ester of $PGF_{2\alpha}$.

7. The method of claim 2 wherein the effective, nontoxic amount for inducing labor and delivery is administered orally within a period of from about 28 weeks of pregnancy to about post-term.

8. The method of claim 7 wherein the prostaglandin is $PGE_2$ or a pharmaceutically acceptable salt thereof.

9. The method of claim 7 wherein the prostaglandin is an alkyl ester of $PGE_2$.

10. The method of claim 7 wherein the prostaglandin is $PGF_{2\alpha}$ or a pharmaceutically acceptable salt thereof.

11. The method of claim 7 wherein the prostaglandin is an alkyl ester of $PGF_{2\alpha}$.

12. The method of claim 2 wherein the effective, nontoxic amount for inducing labor and delivery is administered intravenously within a period of from about 28 weeks of pregnancy to about post-term.

13. The method of claim 12 wherein the prostaglandin is $PGE_2$ or a pharmaceutically acceptable salt thereof.

14. The method of claim 12 wherein the prostaglandin is an alkyl ester of $PGE_2$.

15. The method of claim 12 wherein the prostaglandin is $PGF_{2\alpha}$ or a pharmaceutically acceptable salt thereof.

16. The method of claim 12 wherein the prostaglandin is an alkyl ester of $PGF_{2\alpha}$.

* * * * *

UNITED STATES PATENT OFFICE
CERTIFICATE OF CORRECTION

Patent No. 3,917,864     Dated November 4, 1975

Inventor(s) Sultanali M. M. Karim

It is certified that error appears in the above-identified patent and that said Letters Patent are hereby corrected as shown below:

Column 1, line 56, "diazonydrocarbons" should read -- diazohydrocarbons --.  Column 4, line 52, "$PGF_2$" should read -- $PGF_{2\alpha}$ --; line 58, "$PGE_2\alpha$" should read -- $PGF_{2\alpha}$ --.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*